(12) United States Patent
Van Dine et al.

(10) Patent No.: US 6,331,366 B1
(45) Date of Patent: Dec. 18, 2001

(54) OPERATING SYSTEM FOR A FUEL CELL POWER PLANT

(75) Inventors: Leslie L. Van Dine, Manchester; Albert P. Grasso, Vernon, both of CT (US)

(73) Assignee: International Fuel Cells LLC, South Windsor, CT (US)

(*) Notice: Subject to any disclaimer, the term of this patent is extended or adjusted under 35 U.S.C. 154(b) by 0 days.

(21) Appl. No.: 09/338,608

(22) Filed: Jun. 23, 1999

(51) Int. Cl.$^7$ ........................................... H01M 8/06
(52) U.S. Cl. ........................... 429/17; 429/20; 429/26
(58) Field of Search .................. 429/17, 19, 20, 429/26

(56) References Cited

U.S. PATENT DOCUMENTS

| | | | |
|---|---|---|---|
| 3,576,627 | * 4/1971 | Keating et al. | 429/26 |
| 3,976,507 | 8/1976 | Bloomfield . | |
| 3,982,962 | * 9/1976 | Bloomfield . | |
| 4,128,700 | 12/1978 | Sederquist | 429/17 |
| 4,365,006 | * 12/1982 | Baker | 429/17 |
| 4,678,723 | 7/1987 | Werthiem | 429/20 |
| 4,902,586 | 2/1990 | Wertheim | 429/20 |
| 5,542,968 | * 8/1996 | Belding et al. | 96/125 |
| 5,573,866 | 11/1996 | Van Dine et al. | 429/13 |
| 5,660,048 | * 8/1997 | Belding et al. | 62/94 |
| 5,900,329 | * 5/1999 | Reiter | 429/17 |
| 6,013,385 | * 1/2000 | DuBose | 429/17 |

OTHER PUBLICATIONS

PCT International Patent Application No. WO 99/05741, published Feb. 4, 1999.

* cited by examiner

*Primary Examiner*—Stephen Kalafut
(74) *Attorney, Agent, or Firm*—Malcolm J. Chisholm, Jr.

(57) ABSTRACT

The invention is an operating system for a fuel cell power plant that includes at least one fuel cell for producing electrical energy from a reducing and oxidant fluid and fuel processing components including a reformer and a burner for processing a hydrocarbon fuel into the reducing fluid, and a direct mass and heat transfer device secured in fluid communication with both a process oxidant stream and a plant exhaust passage, so that the device directly transfers mass such as water exiting the plant in a plant exhaust stream back into the plant within the process oxidant stream. The invention also includes a split oxidant passage that directs the process oxidant stream through the fuel cell and a reformer feed portion of the process oxidant stream into fluid communication with the fuel processing components. The system may also include an anode exhaust passage that directs an anode exhaust from the fuel cell into the burner, then directs the oxidized anode exhaust stream from the burner in heat exchange relationship with the reformer feed portion.

24 Claims, 2 Drawing Sheets

OPERATING SYSTEM FOR A FUEL CELL POWER PLANT

TECHNICAL FIELD

The present invention relates to fuel cell power plants that are suited for usage in transportation vehicles, portable power plants, or as stationary power plants, and the invention especially relates to an operating system for a fuel cell power plant that minimizes free liquid water in the plant and that eliminates a need for either a condensing heat exchanger for condensing water or for a boiler to generate steam.

BACKGROUND OF THE INVENTION

Fuel cell power plants are well-known and are commonly used to produce electrical energy from reducing and oxidizing fluids to power electrical apparatus such as apparatus on-board space vehicles, or on-site generators for buildings. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes.

It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

In operation of PEN fuel cells, it is critical that a proper water balance be maintained between a rate at which water is produced at the cathode electrode and rates at which water is removed from the cathode and at which water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode, the PEM may dry out limiting ability of hydrogen ions to pass through the PEM, thus decreasing cell performance.

As fuel cells have been integrated into power plants developed to power transportation vehicles such as automobiles, trucks, buses, etc., maintaining a water balance within the power plant has become a greater challenge because of a variety of factors. For example, with a stationary fuel cell power plant, water lost from the plant may be replaced by water supplied to the plant from off-plant sources. With a transportation vehicle, however, to minimize fuel cell power plant weight and space requirements, the plant must be self-sufficient in water to be viable. Self-sufficiency in water means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

An additional requirement for maintaining water self-sufficiency in fuel cell power plants is associated with components necessary to process hydrocarbon fuels, such as methane, natural gas, gasoline, diesel fuel, etc., into an appropriate reducing fluid that provides a hydrogen rich fluid to the anode electrode. Such fuel processing components of a fuel cell power plant typically include a boiler that generates steam; a steam duct into which the hydrocarbon fuel is injected; and an autothermal reformer that receives the steam and fuel mixture along with a small amount of a process oxidant such as air and transforms the mixture into a hydrogen-enriched reducing fluid appropriate for delivery to the anode electrode of the fuel cell. The fuel processing components or system water and energy requirements are part of an overall water balance and energy requirement of the fuel cell power plant. Water made into steam in the boiler must be replaced by water recovered from the plant such as by condensing heat exchangers in the cathode exhaust stream and associated piping. Additionally, process oxidant streams that also support the boiler and reformer must be maintained within a stable humidity range to prevent variations in performance of those components. When the process oxidant streams for the fuel processing components are supplied by ambient air, humidifying the streams to stabilize performance of those fuel processing components further complicates maintaining the water balance of such a fuel cell power plant.

A common approach to enhancing water recovery and retention is use of condensing heat exchangers in exhaust streams of the power plant wherein the exhaust streams are cooled to a temperature at or below their dew points to precipitate liquid out of the exhaust streams so that the liquid may be returned to the power plant. An example of a PEM fuel cell power plant using a condensing heat exchanger is shown in U.S. Pat. No. 5,573,866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool a cathode exhaust stream, which upon leaving a cathode chamber includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced the water recovery and energy efficiency of fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air coolant stream passes through a heat exchanger, performance of the exchanger will vary as a direct function of the temperature of the ambient air because decreasing amounts of liquid precipitate out of power plant exhaust streams as the ambient air temperature increases.

An additional requirement of using such condensing heat exchangers in fuel cell power plants powering transportation vehicles is related to operation of the vehicles in temperatures below the freezing temperature of water. Because water from such exchangers is often re-introduced into the PEM fuel cells of the plant, the water may not be mixed with conventional antifreeze to lower its freezing temperature. Propylene glycol and similar antifreezes would be adsorbed by the catalysts in the cells decreasing cell efficiency, as is well known.

A further problem associated with using fuel cell power plants in transportation vehicles arises from a need to have such vehicles capable of commencing immediate operation without any significant warm-up period. Use of a boiler to generate steam in the fuel processing system, however, requires either a warm up period; a substantial energy cost to rapidly initiate boiling; or, an alternative fuel source for the cells or power source for the plant until the fuel processing components are capable of generating adequate fuel.

In some prior art fuel cell power plants utilizing fuel reformers, it is known to direct all or a portion of a cathode exhaust stream into the fuel reformer to thereby minimize water recovery apparatus such as condensing heat exchangers, such as U.S. Pat. No. 3,976,507 issued on Aug. 24, 1976 to Bloomfield, and U.S. Pat. No. 4,128,700 issued on Dec. 5, 1978 to Sederquist. Both of those patents are assigned to the assignee of the present invention, and are hereby incorporated herein by reference. While such older patents show minimization of water recovery efforts, those and other known fuel cell power plants that direct cathode exhaust streams directly into fuel processing components are typically complex pressurized plants that involve use of supercharging turbines mechanically linked to compressors that do not have a self-sufficient water balance. Therefore those plants have not been shown to be appropriate for utilization in transportation vehicles which require a fuel cell power plant that must operate within water balance through a wide variety of environmental conditions.

Accordingly, known fuel cell power plants that employ ambient air as the cathode oxidant, that use condensing heat exchangers, and/or that utilize a boiler to generate steam in fuel processing components are incapable of maintaining a self-sufficient water balance and providing for a rapid generation of power because of their above described characteristics. It is therefore highly desirable to produce a fuel cell power plant that can achieve a self-sufficient water balance and immediate generation of power without a condensing heat exchanger and boiler while minimizing plant operating energy requirements.

DISCLOSURE OF THE INVENTION

The invention is an operating system for a fuel cell power plant. The system includes at least one fuel cell for producing electrical energy from a reducing and oxidant fluid; fuel processing components including an autothermal reformer and a burner for processing a hydrocarbon into the reducing fluid; a direct mass and heat transfer device secured in fluid communication with both an oxidant inlet line that directs the oxidant fluid in a process oxidant stream into the fuel cell and also with a plant exhaust passage, so that the device directly transfers mass and heat such as water exiting the plant in a plant exhaust stream within the exhaust passage back into the plant within the process oxidant stream; a split oxidant passage that directs the process oxidant stream through the fuel cell means and that also directs a reformer feed portion of the process oxidant stream through at least one reformer feed branch of the split oxidant passage into fluid communication with the fuel processing components, and that directs an exhaust portion of the process oxidant stream through an exhaust branch of the split oxidant passage from the fuel cell into the plant exhaust passage; and, an anode exhaust passage that receives an anode exhaust stream exiting the fuel cell, directs the anode exhaust into the burner, then directs the oxidized anode exhaust stream from the burner in heat exchange relationship with the reformer feed portion of the process oxidant stream within the reformer feed branch of the split oxidant passage, and then directs the oxidized anode exhaust stream into the plant exhaust passage to mix with the exhaust portion of the process oxidant stream and to thereby become the plant exhaust stream. Reformer feed branches of the split oxidant passage may direct the process oxidant stream into the fuel processing components before or after the process oxidant stream passes through the fuel cell.

In alternative embodiments, the system includes a coolant loop that directs a coolant fluid through at least one sealed or porous coolant plate adjacent the fuel cell to remove heat from the fuel cell, and an electrolyte of the fuel cell is a proton exchange membrane ("PEM").

In use of the operating system for a fuel cell power plant, the split oxidant passage feeds reformer feed portions of the process oxidant stream into the fuel processing components so that adequate water is primarily supplied to the fuel processing autothermal reformer from water generated within the fuel cell. Consequently, no separate feed of liquid water is necessary to operate the fuel processing components. Additionally, because the split oxidant passage directs an exhaust portion of the process oxidant stream exiting the fuel cell into the plant exhaust passage and hence into the direct mass and heat transfer device, water in that portion of the process exhaust stream is transferred back into the fuel cell within the process oxidant stream passing through the direct mass and heat transfer device before entering the fuel cell, and therefore the plant is maintained in water balance with no free liquid water. In order to cool the fuel cell, a coolant fluid within the coolant loop may be an anti-freeze fluid, wherein a coolant plate adjacent the cell is sealed from the cell components, and therefore cannot contaminate cell catalysts and will not freeze during ordinary operating conditions of known transportation vehicles.

The direct mass and heat transfer device passes the incoming process oxidant stream upstream of the fuel cell in mass transfer relationship with the plant exhaust stream that includes both the exhaust portion of the oxidant stream leaving the fuel cell from a cathode flow field within the fuel cell and the oxidized anode exhaust stream, so that mass and heat such as water vapor in the plant exhaust stream transfer directly through a mass transfer medium of the mass transfer device to the incoming process oxidant stream prior to the stream entering the fuel cell. The direct mass and heat transfer device includes a separator housing for supporting the transfer medium in mass transfer relationship with the incoming process oxidant stream and the power plant exhaust stream so that the streams contact the transfer medium and the separator housing prevents bulk mixing of the streams. The transfer medium may comprise any of a variety of materials for sorbing a fluid substance consisting of polar molecules such as water molecules from a stream containing fluid substances consisting of polar and non-polar molecules. An exemplary transfer medium includes a liquid water portion of a water saturated polyflourosulfonic ionomer membrane. A further exemplary transfer medium means may comprise a liquid water portion of a fine pore porous media in which case a separator housing would comprise the material defining the pores within the porous media.

Because no free liquid water is necessary in the fuel processing components or the coolant loop of the power plant, the plant may be operated in water balance while eliminating large, heavy condensing heat exchangers and control apparatus necessary for operating such exchangers. The operating system therefore also eliminates accumulators and boilers and large blocks of ice that form within such vessels that are difficult to quickly melt. Additionally, upon start-up, the plant may quickly commence generating electrical energy to power a transportation vehicle without any need for a lengthy warm-up period to generate steam for supporting the reformer of the fuel processing components.

Accordingly, it is a general object of the present invention to provide an operating system for a fuel cell power plant that overcomes deficiencies of prior art fuel cell power plants.

It is a more specific object to provide an operating system for a fuel cell power plant that is self-sufficient in water over a broad range of operating conditions.

It is yet another object to provide an operating system for a fuel cell power plant that returns to the plant water exiting the plant without utilizing a condensing heat exchanger.

It is still a further object to provide an operating system for a fuel cell power plant that processes a hydrogen rich reducing fluid without any free liquid water and without a boiler for generating steam.

It is yet another object to provide an operating system for a fuel cell power plant that directly transfers mass exiting the power plant back into plant process oxidant streams to humidify and heat those oxidant streams.

It is still another specific object to provide an operating system for a fuel cell power plant that transfers water exiting the plant in oxidant and anode exhaust streams to components for processing hydrocarbon fuels utilized by the plant.

These and other objects and advantages of this invention will become more readily apparent when the following description is read in conjunction with the accompanying drawing.

DESCRIPTION OF THE PREFERRED EMBODIMENTS

Referring to the drawings in detail, an operating system for a fuel cell power plant of the present invention is shown and generally designated by the reference numeral 10. The system 10 includes at least one fuel cell means for producing electrical energy from a reducing fluid and an oxidant stream, such as fuel cell 12. The fuel cell 12 has an electrolyte 14 such as a proton exchange membrane ("PEM"), an anode electrode 16 and a cathode electrode 18 on opposed sides of the electrolyte 14. The fuel cell 12 may be combined with other virtually identical fuel cells (not shown) in a well-known manner to form a cell stack assembly enclosed within a frame structure 20 shown schematically in FIGS. 1 and 2, that defines manifolds for directing a reducing fluid stream and process oxidant stream into and out of the fuel cell 12 in a manner well-known in the art. A reducing fluid inlet 22 directs a hydrogen rich reducing fluid stored in a fuel supply 24 (labelled "FUEL" in FIGS. 1 and 2 to facilitate understanding) into the cell through manifolding defined within the frame 20 so that the reducing fluid passes through an anode flow field 26 defined adjacent the anode electrode 16. Similarly, an oxidant inlet line 28 directs an oxidant stream such as air from an oxidant supply 30 (labelled "OXIDANT" in FIGS. 1 and 2) into the cell 12 through oxidant manifolding defined within the frame 20 so that the oxidant passes through a cathode flow field 32 defined adjacent the cathode electrode 18.

Figure 1:
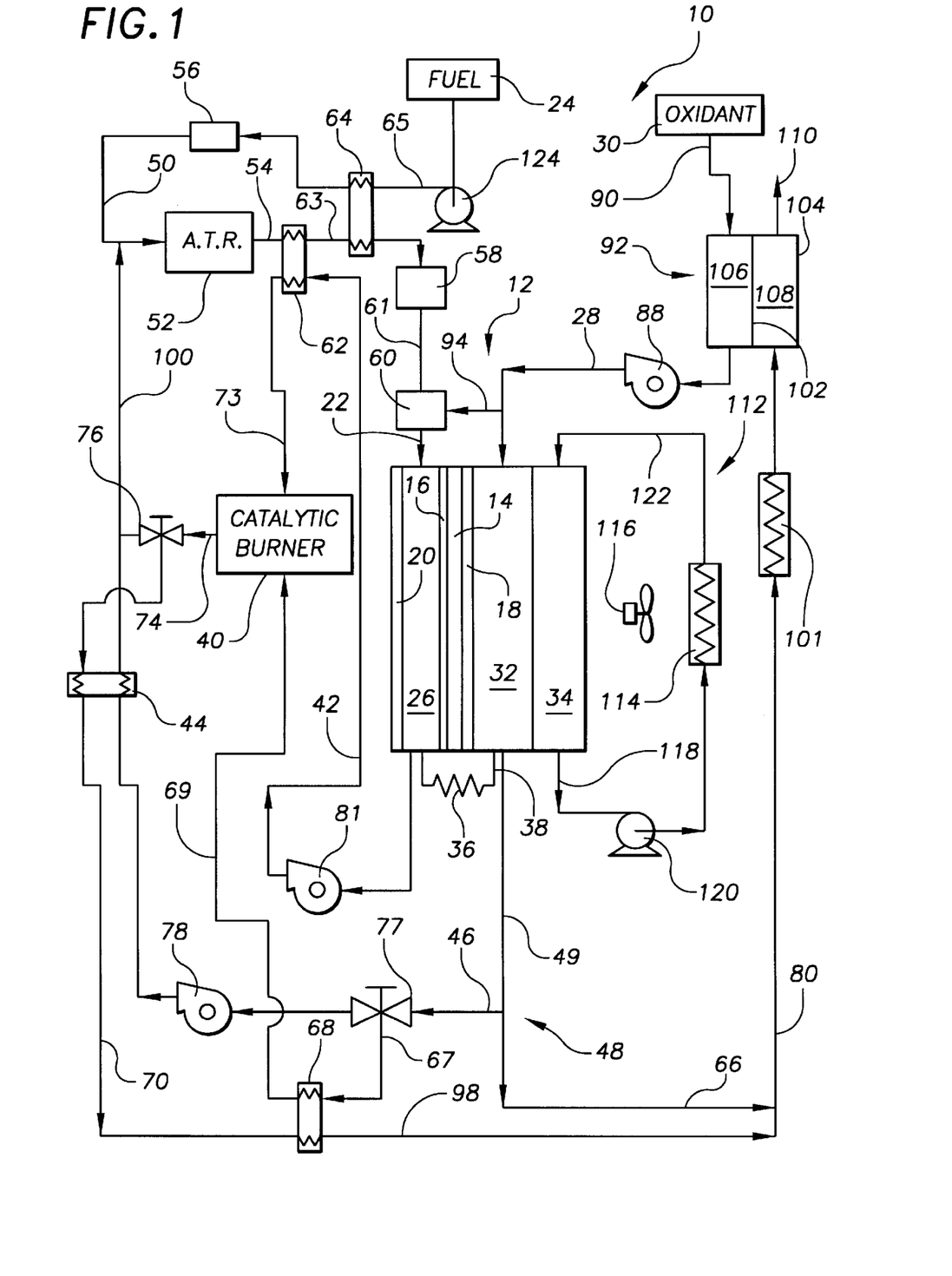
FIG. 1 is a schematic representation of an operating system for a fuel cell power plant constructed in accordance with the present invention, showing a first embodiment of a split oxidant passage of the system.
Figure 2:
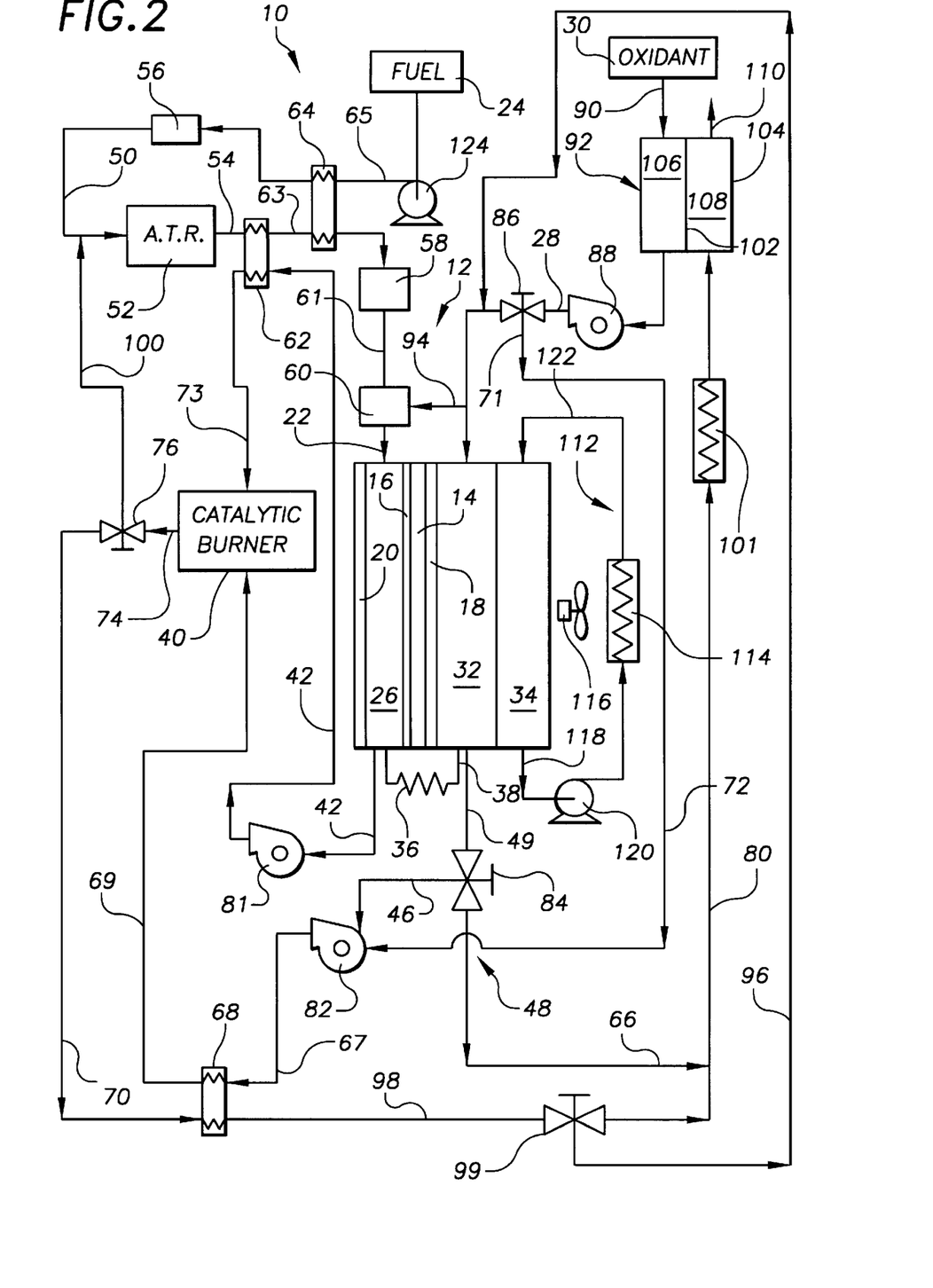
FIG. 2 is a schematic representation of the present operating system for a fuel cell power plant, showing a second embodiment of the split oxidant passage of the system.

The fuel cell 12 may also include a coolant plate means for removing heat from the fuel cell 12, wherein the coolant plate means may be a porous or sealed coolant plate 34 adjacent the cathode flow field 32. Whenever the coolant plate is described as sealed, it is meant that a coolant fluid in, or passing through the sealed coolant plate 34 cannot pass into the cathode flow field 32, or an anode flow field of an adjacent second fuel cell (not shown). By describing the coolant plate 34 as porous, in contrast, it is meant that a coolant fluid in, or passing through the coolant plate may pass into the cathode flow field 32 and/or anode flow field 26, and that water within the anode or cathode flow fields 26, 32 may move into the porous coolant plate 34. The anode and cathode flow fields 26, 32 may be cavities defined adjacent the anode and cathode electrodes 16, 18 by the frame structure 20, or they may consist of a plurality of small passages, channels, or pores defined within porous or channeled graphite, carbon or metal sheets, as is common in the art. The frame structure 20 also includes common electrical conduction means for directing an electrical current generated by the fuel cell out of the cell 12 to an electricity using device 36, such as through a standard external load circuit 38.

The operating system 10 also includes fuel processing component means for processing hydrocarbon fuels into reducing fluids appropriate for providing fuel to an anode electrode of a fuel cell. Exemplary hydrocarbon fuels for powering such a plant 10 include gasoline, diesel fuel, butane, propane, natural gas, methanol, ethanol, etc. The fuel processing component means may include: a burner 40 that may be a conventional or preferably a catalytic burner (labelled "CATALYTIC BURNER" in FIGS. 1 and 2 for convenience) that oxidizes any excess reducing fluid such as hydrogen fed to the burner 40 as an anode exhaust stream through an anode exhaust passage 42 in fluid communication with, and after passing through, the anode flow field 26; a first heat exchanger 44 (shown only in FIG. 1) that receives an oxidized anode exhaust stream within the anode exhaust passage 42 from the burner 40 and passes the oxidized anode exhaust in heat exchange relationship with a first reformer feed portion of an oxidant stream within a first reformer feed branch 46 of a split oxidant passage 48 in fluid communication with the oxidant inlet 28; a fuel delivery line 50 that feeds the stored hydrocarbon fuel from the fuel supply 24; a reformer 52 that may be an autothermal reformer (labelled "A.T.R." in FIGS. 1 and 2) that receives the fuel from the fuel delivery line 50 and receives the heated first reformer feed portion of the oxidant stream from the first heat exchanger 44 in the first reformer feed branch 46 of the split oxidant passage 48; and, a reformed fuel discharge line 54 that directs the reformed fuel from the reformer 52 into the reducing fluid inlet 22.

Any unused hydrogen in the anode exhaust stream is oxidized in the burner 40 to thereby heat the anode exhaust stream leaving the burner 40 within the anode exhaust passage 42 and to render the anode exhaust stream leaving the burner 40 non-flammable. The fuel processing component means may include components that are well-known in conventional steam reforming, autothermal reforming, and partial oxidation processing of various hydrocarbon fuels. The fuel processing components are of relatively conventional design that are generally well-known in the chemical processing arts wherein there is a need to generate hydrogen enriched fluid from common hydrocarbon sources. For example, autothermal reformers in such processes typically burn a portion of the fuel received to reach temperatures approximating 1,700 degrees fahrenheit (hereafter "° F."). Additional fuel processing component means may include a de-sulfizer 56 secured on the fuel delivery line 50 to remove any sulfur from the hydrocarbon fuel; a water shift reactor 58 and a selective oxidizer 60, which are secured in series in fluid communication with and along a second extension 61 of the reformed fuel discharge line 54 and that direct the reformed fuel into the reducing fluid inlet 22 in order to minimize carbon monoxide levels in the reducing fluid stream entering the anode flow field 26, as is well-known in the art. The fuel processing component means may also include a second heat exchanger 62 secured in heat exchange relationship between the reformed fuel discharge line 54 and the anode exhaust passage 42 to heat the anode exhaust stream within the anode exhaust passage 42; and, a third heat exchanger 64 secured in heat exchange relationship between a first extension 63 of the reformed fuel discharge line 54 and an inlet line 65 of the fuel delivery line 50 to heat the fuel within the delivery line 50.

The split oxidant passage 48 may be a split oxidant passage means for selectively splitting reformer feed and exhaust portions of the oxidant stream passing into and out of the fuel cell 12 into reformer feed and exhaust branches of the split oxidant passage means for delivery of the reformer feed and exhaust portions of the oxidant stream to differing components of the system 10. The split oxidant passage means 48 may include control means well-known in fluid conduction and control art for regulating proportions of the oxidant stream delivered to components of the system 10, such as temperature and/or humidity sensors in communication with standard electromechanical valves, etc. The split oxidant passage means 48 includes the first reformer feed branch 46 that directs a first reformer feed portion of the oxidant stream leaving the fuel cell 12 within a cathode exhaust passage 49 from the fuel cell 12 to the fuel processing component means. The split oxidant passage also includes an exhaust branch 66 that delivers an exhaust portion of the oxidant stream from the cathode exhaust passage 49 of the fuel cell 12 to a plant exhaust passage 80. The split oxidant passage 48 may also include a second reformer feed branch 67 or fuel cell 12 to burner 40 feed branch 67 that delivers a second reformer feed portion of the process oxidant stream from the fuel cell 12 to the catalytic burner 40 of the fuel processing components. A fourth heat exchanger 68 of the fuel processing components may be secured in heat exchange relationship between the second reformer feed branch 67 of the split oxidant passage 48 and a third extension 70 of the anode exhaust passage 42 to transfer heat from the oxidized anode exhaust stream into the oxidant stream within the second reformer feed branch 67. A first extension 69 of the second reformer feed branch 67 of the split oxidant passage directs the heated second reformer feed portion of the oxidant stream from the fourth heat exchanger 68 to the catalytic burner 40. The split oxidant passage 48 may also include a third reformer feed branch 72 or oxidant inlet line 28 to fuel processing component feed branch 72 (shown only in FIG. 2) that directs a third reformer feed portion of the process oxidant stream from the oxidant inlet line 28 through a third reformer feed line 71 to the fuel processing components means directly, or optionally as shown in FIG. 2 through the second reformer feed branch 67 of the split oxidant passage 48, fourth heat exchanger 68, and first extension 69 of the second reformer feed branch 67.

As seen in FIGS. 1 & 2, the anode exhaust passage 42 directs the anode exhaust stream from the fuel cell 12 into the second heat exchanger 62; a first extension 73 of the anode exhaust passage 42 directs the heated anode exhaust stream into the catalytic burner; a second extension 74 of the anode exhaust passage 42 directs the oxidized anode exhaust stream into the first heat exchanger 44 to heat the first reformer feed portion of the process oxidant stream in the first reformer feed branch 46 of the split oxidant passage; and the third extension 70 of the anode exhaust passage 42 directs the stream into the fourth heat exchanger 68.

In FIG. 1, a first embodiment of the split oxidant passage means 48 is shown, wherein a first reformer feed valve 76 is positioned between the burner 40, the reformer 52 and the first heat exchanger 44 to selectively control distribution of the oxidized anode exhaust stream from the burner 40 so that all or a portion of the oxidized anode exhaust stream may be directed by the first reformer feed valve 76 from the burner 40 to either the reformer 52 or the first heat exchanger 44 in the third extension 70 of the anode exhaust passage 42. In the first embodiment of the split oxidant passage 48, all or a portion of the first reformer feed portion of the process oxidant stream may be controlled to be directed into the reformer 52 by way of the first reformer feed branch 46 of the split oxidant passage 48, or all or a portion of the process stream may controlled by a second reformer feed valve 77 to be directed into the burner 40 by way of the second reformer feed branch 67. In the first embodiment of the split oxidant passage shown in FIG. 1, a first reformer feed blower 78 may optionally be positioned along the first reformer feed branch 46 of the split oxidant passage, and an anode exhaust blower 81 may be positioned along the anode exhaust passage 42 to slightly increase the pressure of the reformer feed portions of the oxidant stream and the anode exhaust stream.

In FIG. 2, a second embodiment of the split oxidant passage 48 is shown, wherein the first heat exchanger 44 may be eliminated, and the third reformer feed portion of the process oxidant stream maybe directed through the third reformer feed branch 72 of the split oxidant passage into the burner 40 directly or optionally through the second reformer feed branch 67. In the second embodiment, a third reformer feed blower 82 may optionally be positioned on the third reformer feed branch 72 to slightly increase pressure of the third reformer feed portion of the oxidant stream. In the embodiment of the split oxidant passage 48 shown in FIG. 2, a third reformer feed valve 84 may be positioned to selectively direct all or a portion of the process oxidant stream exiting the fuel cell 12 within the cathode exhaust passage 49 into the burner 40 with the third reformer feed portion of the oxidant stream through the third reformer feed blower 82 and second reformer feed branch 67, or the third reformer feed valve 84 may direct all or a portion of the oxidant stream from the cathode exhaust passage 49 into the exhaust branch 66 of the split oxidant passage 48 to enter the plant exhaust passage 80. The third reformer feed portion of the oxidant stream may be directed into the third reformer feed passage 72 from the oxidant inlet line 28 by a fourth reformer feed valve 86 positioned on the oxidant inlet line 28. An oxidant blower 88 may also be positioned on the oxidant inlet line 28 to variably accelerate flow of gaseous oxidant into the fuel cell 12. Optionally, the oxidant blower 88 may be positioned along a primary oxidant passage 90 secured between the oxidant supply 30 and a mass and heat transfer device 92 for the same purposes. As shown in FIGS. 1 and 2, the oxidant inlet line 28 may include an oxidant branch line 94 secured to the selective oxidizer 60 for directing a portion of the process oxidant stream into the selective oxidizer 60.

As shown in FIG. 2, the operating system 10 may also include an oxidized anode exhaust diversion line 96 secured between a fourth extension 98 of the anode exhaust passage 42 and the oxidant inlet line 28 for directing all or a portion of the oxidized anode exhaust stream into the process oxidant inlet line 28 entering the fuel cell 12. An oxidized anode diversion valve 99 may be positioned on the fourth extension 98 of the anode exhaust passage to divert the oxidized anode exhaust stream into the oxidized anode exhaust diversion line 96.

It is pointed out that, while FIGS. 1 and 2 show alternative embodiments of the operating system for a fuel cell power plant 10, such embodiments are not to be seen as exclusive, but are primarily described in different Figures for ease of explanation, and all such embodiments or any portions thereof may be used in one operating system 10 for a fuel cell power plant, depending upon performance requirements for such an operating system 10.

As shown in FIGS. 1 and 2, the split oxidant passage 48 includes a reformer feed line 100 secured to the first reformer feed branch 46 of the split oxidant passage 48 (shown in FIG. 1) and second extension 74 of the anode exhaust passage 42 leaving the burner 40 (shown in FIGS. 1 and 2). The reformer feed line 100 directs the reformer feed portions of the process oxidant stream into the reformer 52 directly, or through the fuel delivery line 50 prior to entering the reformer 52, as shown in FIGS. 1 and 2.

The plant exhaust passage 80 directs the plant exhaust stream into a direct mass and heat transfer device means for directly transferring mass from a first fluid stream passing through the device to a second fluid stream passing through the device, such as the direct mass and heat transfer device 92. The direct mass and heat transfer device 92 is secured in fluid communication with both the primary oxidant passage 90 and the plant exhaust passage 80. A plant exhaust heat exchanger 101 may be secured along the plant exhaust passage 80 upstream of the direct mass and heat transfer device 92 in order to lower a temperature of the plant exhaust stream within the passage 80 prior to entering the transfer device 92. The mass and heat transfer device 92 is driven by a difference in a partial pressure of polar molecules within the plant exhaust stream and a partial pressure of polar molecules within the process oxidant stream, and by a difference in temperatures between the two streams within the transfer device 92.

The direct mass and heat transfer device 92 includes a transfer medium means 102 for sorbing a fluid substance consisting of polar molecules within a first fluid stream containing fluid substances consisting of polar and non-polar molecules, such as a stream including water vapor and/or entrained liquid moisture (being a fluid substance consisting of polar molecules) and air (being a fluid substance consisting of non-polar molecules), and for desorbing the sorbed fluid into a second stream having a lower proportion of the fluid substance consisting of polar molecules than the first stream. The direct mass and heat transfer device 92 also includes a separator housing means 104 for supporting the transfer medium means 102 in mass transfer relationship with the plant exhaust stream and the process oxidant stream so that both streams contact the mass transfer medium means 102 and the separator housing means prevents bulk mixing of the plant exhaust and process oxidant streams.

Exemplary transfer medium means 102 include a liquid water portion of an ion exchange resin or an ionomeric membrane such as a water saturated polyflourosulfonic ionomer membrane sold under the brand name "NAFION" by the E.I. DuPont company of Willmington, Del., U.S.A., or a liquid water portion of tubes made of the aforesaid "NAFION" membrane and sold under the brand name "ME-SERIES MOISTURE EXCHANGERS" by the Perma Pure, Inc. company of Toms River, N.J., U.S.A. Another transfer medium means 102 may comprise a liquid water portion of a fine pore porous media in which case the separator housing 104 would comprise the media or material defining the pores within the porous media. An additional transfer medium 102 includes a desiccant material capable of sorbing moisture from a gaseous stream and capable of desorbing the moisture into a gaseous stream such as finely powdered solid, crystalline alkali metal or alkaline earth metal compounds including active carbons, silica gel, activated aluminas and zeolites as described in more detail at Column 5, line 9 to Column 6, line 17 in U.S. Pat. No. 5,542,968 issued on Aug. 6, 1996 to Belding et al., which patent is hereby incorporated herein by reference.

Exemplary separator housing means 104 may include an enclosure (shown schematically in FIG. 1 by reference number 104) that supports the transfer medium means 102 between an oxidant inlet chamber 106 and a plant exhaust chamber 108. The process oxidant stream passes from the oxidant supply 30 through primary oxidant inlet passage 90 into and through the oxidant inlet chamber 106 into the oxidant inlet line 28, while the plant exhaust stream passes from the plant exhaust passage 80 into and through the plant exhaust chamber 108 to leave the plant 10 through a plant discharge vent 110. Additional separator housing means 104 may include more complicated enclosures structured to enhance exposure of the process oxidant and plant exhaust streams to the mass transfer medium means while preventing bulk mixing of the streams such as enclosures common in known fluid to fluid heat exchanger art. An additional and cooperative aspect of the separator housing means 104 includes membrane portions supporting liquid water portions in the aforesaid "NAFION" membrane materials and tube portions supporting liquid water in the aforesaid "NAFION"-based tubes that are sold under the brand name "ME-SERIES MOISTURE EXCHANGERS" by Perma Pure, Inc. In such a separator housing means 104, "NAFION"-based mass transfer medium means will selectively transfer fluid substances consisting of polar molecules such as water vapor or entrained liquid moisture from a side of the membrane having a greatest concentration of the fluid substances consisting of polar molecules to a side having a lesser concentration in a manner well-known in the art.

A further exemplary separator housing means 104 includes an enthalpy wheel that supports the aforesaid desiccant transfer medium means in a rotational disposition between a moisture laden plant exhaust stream and a dry process oxidant stream, as described in more detail at Column 4, line 35 to Column 5, line 4 and generally throughout the aforesaid U.S. Pat. No. 5,542,968. The wheel includes a plurality of open ended passages running generally parallel to an axis of rotation of the wheel, wherein the passages are typically formed by winding a flat sheet of corrugated paper board including the mass transfer medium desiccant around a central hub of the wheel until a multi-layered media is built up that extends to an outer housing of a cassette supporting the wheel. Such enthalpy wheels are well-known in building air-conditioning arts, as further described in U.S. Pat. No. 5,660,048 that issued on Aug. 26, 1997 to Bedding et al. and is incorporated herein by reference. As a separator housing means, the enthalpy wheel would be supported to rotate about an axis parallel to flow through the inlet and exhaust chambers 106, 108 so that the plant exhaust stream passes through about one-half of the wheel while simultaneously the process oxidant stream passes through the other half of the wheel. The transfer medium means desiccant on a first portion of the wheel within the plant exhaust chamber 108 for example would thereby sorb a fluid substance consisting of polar molecules such as water vapor or entrained liquid moisture from the plant exhaust stream and, when the wheel rotates to position that first portion of the wheel into the oxidant inlet chamber 106, if the concentration of the fluid substance consisting of polar molecules within the inlet oxidant stream is less that the concentration of the fluid substance consisting of fluid molecules within the plant exhaust stream, the sorbed polar molecule fluid substance held by the desiccant would be desorbed into the process oxidant stream to humidify and heat the oxidant stream.

The operating system 10 for a fuel cell power plant also includes coolant means for removing heat from the fuel cell 12 through the coolant plate 34. The means may be any of a variety of known methods of directing a cooling fluid through the coolant plate 34. One example of an appropriate cooling means includes simply directing or forcing ambient air or another cooling fluid to pass through a coolant plate 34 that is sealed, and utilizing a variety of heat removing surfaces within the plate to enhance heat transfer, wherein the cooling fluid does not leave such a sealed coolant plate 34 to enter adjacent cathode or anode flow fields 26, 32 as described above. In a preferred embodiment, as shown in FIGS. 1 and 2, the coolant means may include a coolant loop means 112 for cycling a cooling fluid through a sealed or unsealed coolant plate 34, wherein the coolant loop has a radiator 114 cooled by a motorized fan 116 that may be similar to conventional transportation vehicle radiators and fans, such as in automobiles; a coolant outlet passage 118 that directs a cooling fluid from the coolant plate 34 through a standard coolant pump 120 and into the radiator 114; and a coolant inlet passage 122 that directs the cooling fluid from the coolant radiator 114 back to the coolant plate 34. When the operating system 10 utilizes a coolant plate 34 that is sealed, the cooling fluid is preferably an antifreeze solution such as well known solutions consisting of methanol-water, ethylene glycol-water, or propylene glycol-water.

It is stressed again that a primary attribute of the operating system 10 for a fuel cell power plant of the present invention is to provide adequate water from the fuel cell 12 to the fuel processing components such as the burner 40 and/or the reformer 52 to minimize or eliminate requirements for free water within the system. Consequently, whenever the third reformer feed branch 72 of the split oxidant passage 48 is relied upon, a coolant plate 34 that is porous is also utilized and the first reformer feed valve 76 is controlled to direct some portion of the oxidized anode exhaust stream to pass from the burner 40 to the autothermal reformer 52. That is because the third reformer feed branch does not receive any water exiting the fuel cell 12, unlike the first and second reformer feed branches 46, 67 that receive portions of the process oxidant stream from the cathode exhaust passage 49 that have passed through the fuel cell 12 and have therefore removed water generated at the cathode electrode 18 during operation of the cell. Such a porous coolant plate 34 provides for movement of water generated at the cathode electrode 18 into and through the porous coolant plate 34 and into an adjacent anode flow field so that the water may then flow into the anode exhaust passage 42 and into the burner 40 and reformer 52 of the fuel processing components. The operating system 10 may also include a fuel pump 124 that serves to control a rate of flow of the reactant fluid from the fuel supply 24 to the inlet line 65 of the fuel delivery line 50.

It is pointed out that usage of the phrase "fuel cell power plant" is meant to apply to a known fuel cell stack combined with fuel processing components as applied to transportation vehicles, portable and/or stationery power plants, etc., known in the art, and therefore such a "fuel cell power plant" is not specifically shown in FIGS. 1 and 2. However, FIGS. 1 and 2 show schematically a single fuel cell 12 and fuel processing components necessary to describe the system 10, and therefore FIGS. 1 and 2 could also be seen as a schematic representation of a fuel cell power plant.

Optimal operation of the operating system 10 for a fuel cell power plant is achieved when the first, second, third and fourth heat exchangers 44, 62, 64, 68 and burner 40 produce temperature changes within preferable ranges in the anode exhaust stream and in the reformer feed portions of the process oxidant stream and also within the reducing fluid stream. One estimated example of the operating system 10 of the present invention includes process parameters which result in a gasoline/air fuel cell power plant with an efficient water balance, wherein components of the system 10 are constructed and dimensioned to operate as follows:

1. The first heat exchanger 44 is a first heat exchanger means for passing the first reformer feed portion of the process oxidant stream in heat exchange relationship with the oxidized anode exhaust stream so that the first reformer feed portion of the process oxidant stream is at a proper temperature to enter the reformer 52 after mixing with the reducing fluid fuel and reform the reducing fluid in water balance without requiring additional sources of water. The first heat exchanger means includes the first heat exchanger 44 being dimensioned for both receiving the first reformer feed portion of the process oxidant stream within the first reformer feed branch 46 of the split oxidant passage 48 at a temperature of about 240° F. and heating the stream so that it is about 1,150° F. within the first extension 100 of the first reformer feed branch 46 of the split process oxidant passage 48, and also for receiving the oxidized anode exhaust stream in the second extension 74 of the anode exhaust passage 42 at a temperature of about 1,280° F. and removing heat from that stream so that it is about 860° F. within the third extension 70 of the anode exhaust passage 42;

2. The second heat exchanger 62 is a second heat exchanger means for passing the anode exhaust stream in heat exchange relationship with the reformed reducing fluid so that the anode exhaust stream receives adequate heat to be efficiently combusted in the burner 40 and to then pass adequate heat to the first heat exchanger means 44 without addition of separate fuel or heat. The second heat exchanger means includes the second heat exchanger 62 being dimensioned for both receiving the anode exhaust stream within the anode exhaust passage 42 at a temperature of about 180° F. and heating the stream so that it is about 750° F. within the first extension 73 of the anode exhaust passage 42, and also for receiving the reformed reducing fluid within the reformed fuel discharge line 54 leaving the reformer 52 at a temperature of about 1,310° F. and removing heat from the reducing fluid so that it is about 680° F. within the first extension 63 of the reformed fuel discharge line 54;

3. The third heat exchanger 64 is a third heat exchanger means for passing the incoming reducing fluid fuel in heat exchange relationship with the reformed reducing fluid so that the incoming fuel is at an adequate temperature to enter the reformer 52 to mix with the reformer feed portion of the process oxidant stream and be reformed in water balance without requiring additional sources of water. The third heat exchanger means includes the third heat exchanger 64 being dimensioned for both receiving the fuel within inlet line 65 of the fuel delivery line 50 at a temperature of about 77° F. and heating the fuel so that it is about 600° F. within the fuel delivery line 50, and also for receiving the reformed fuel within the first extension 63 of the reformed fuel discharge line 54 at a temperature of about 680° F. and removing heat from the reformed fuel so that it is about 580° F. within the second extension 61 of the reformed fuel delivery line 54;

4. The fourth heat exchanger 68 is a fourth heat exchanger means for passing the second reformer feed portion of the process oxidant stream in heat exchange relationship with the oxidized anode exhaust stream so that the second portion of the process oxidant stream receives adequate heat to enter the burner 40 to support efficient combustion of the anode exhaust stream so the oxidized anode exhaust stream provides adequate heat to the first heat exchanger means without addition of separate fuel, water or heat. The fourth heat exchanger means includes the fourth heat exchanger being dimensioned for both receiving the second portion of the process oxidant stream within the second reformer feed branch 67 of the split oxidant passage 48 at a temperature of about 180° F. and heating that stream so that it is about 750° F. within the first extension 69 of the second reformer feed branch 67 of the split oxidant passage 48, and also for receiving the oxidized anode exhaust stream within the third extension 70 of the anode exhaust passage 42 at a temperature of about 860° F. and removing heat from that stream so that it is about 730° F. within the fourth extension 98 of the anode exhaust passage 42; and, 5. The burner 40 is a burner means for oxidizing the anode exhaust stream and passing the oxidized anode exhaust stream to the first heat exchanger means with adequate heat for heating the first reformer feed portion of the process oxidant stream. The burner means includes the burner 40 being dimensioned for receiving the anode exhaust stream within the first extension 73 of the anode exhaust passage 42 at a temperature of about 750° F., and combusting that stream so that it attains a temperature of about 1,280° F. within the second extension 74 of the anode exhaust passage 42.

It is also estimated that the operating system 10 of the present invention will efficiently maintain a fuel cell power plant in water balance where the plant has a power capacity of about 50 kilowatts, and the fuel cell 12, reformer 52 and direct mass and heat transfer device 92 are constructed and dimensioned to operate according to the following parameters:

1. The fuel cell 12 operates: a. at a pressure (p.s.i.a.) (meaning "pounds per square inch absolute") of about 17.6; b. at a temperature of about 180° F.; c. at a hydrogen utilization of 80%; d. and consumes 3.2 lb.-moles/hr (meaning "pound-moles per hour") of the hydrogen supplied; e. at oxygen utilization of about 54% f. and consumes about 1.6 lb-moles/hr of the oxygen supplied; g. has a total of about 27.1 lb-moles/hr. water supplied to the fuel cell 12; and, h. has a total of 27.1 lb-moles/hr. water removed from the fuel cell;

2. The reformer 52 operates: a. at a temperature of about 1,300° F.; b. at a conversion of greater than 99%; c. at a ratio of total atoms of oxygen to carbon of about 3.25; d. at a ratio of gaseous oxygen atoms to total carbon atoms of about 0.3500; e. at a gasoline feed rate of 1.82 lb.moles/hr; and 3. The direct mass and heat transfer device 92 has an effectiveness of 92% in transferring water from the plant exhaust stream to the process oxidant stream.

The operating system 10 for a fuel cell power plant of the present invention provides substantial flexibility in controlling flow of the process oxidant stream and anode exhaust stream to achieve optimal performance under varying operational requirements. Such enhanced performance is primarily achieved by integrating the first, second and third reformer feed branches 46, 67, 72 and exhaust branch 66 of the split oxygen passage 48 with other system components. For example, the system 10 provides for controlling a first reformer feed portion of the process oxidant stream passing through the fuel cell 12 to flow from the cathode exhaust passage 49 through the first reformer feed branch 46 of the split oxidant passage 48, through the first heat exchanger 44, and into the reformer 52, and for simultaneously and optionally controlling flow of a portion of the oxidized anode exhaust stream leaving the burner 40 to also flow into the reformer 52. Alternatively, the system 10 provides for controlling a second reformer feed portion of the process oxidant stream passing through the fuel cell 12 to flow from the cathode exhaust passage 49 through the second reformer feed branch of the split oxidant passage 48, through fourth heat exchanger 68, into the burner 40, and then into the reformer 52, while simultaneously controlling flow of a portion of the oxidized anode exhaust stream leaving the burner 40 to also flow into the reformer 52 and into the fourth heat exchanger 44.

Additionally, the system 10 provides for controlling a third reformer feed portion of the process oxidant stream flowing into the fuel cell 12 to flow through a third reformer feed branch 72 from the oxidant inlet line 28, through the fourth heat exchanger 68, into the burner 40, and then into the reformer, while simultaneously controlling flow of a portion of the oxidized anode exhaust stream leaving the burner 40 to also flow into the reformer 52 and into the fourth heat exchanger 44. Further, the system enables controlling heat, humidity and moisture content of the process oxidant stream passing into the fuel cell within the oxidant inlet line 28 by direct transfer of heat and moisture from the plant exhaust stream passing directly through the direct mass and heat transfer device 92 from the plant exhaust passage 80 to the oxidant inlet line 28, wherein the plant exhaust passage includes an exhaust portion of the process oxidant stream directed into the plant exhaust passage 80 through the exhaust branch of the split oxidant passage 66. Optionally, the operating system 10 provides for further enhancement of the heat, humidity and moisture content of the process oxidant stream entering the fuel cell by controlling a portion of the oxidized anode exhaust stream to pass directly into the oxidant inlet line 28 from the fourth extension 98 of the anode exhaust passage through the oxidized anode exhaust diversion line 96.

Because the operating system 10 of the present invention enables a fuel cell power plant to operate in water balance, adequate water is retained within the plant to offset water lost from gaseous streams of reducing and oxidant fluids passing out of the plant, and therefore the plant maintains water self sufficiency without use of any condensing heat exchangers; without any free liquid water; and without any boiler to generate steam for the autothermal reformer 52. Additionally, in embodiments of the control system utilizing the first and/or second reformer feed branches 46, 67 of the split oxidant passage 48, the coolant plate 34 may be sealed to restrict passage of any cooling fluid out of the plate and into other fuel cell 12 components. Therefore, enhanced cooling may be achieved through usage of conventional liquid anti-freeze compounds. Accordingly, the operating system 10 provides for efficient operation of the fuel cell and fuel processing components in sub-freezing weather conditions. Additionally, because the direct mass and heat transfer device 92 provides for efficient transfer of water in the plant exhaust stream as a function of partial pressure differences between the plant exhaust stream and process oxidant stream, recovery of water in the plant exhaust stream is efficiently maintained at any ambient temperature or humidity, unlike prior systems utilizing ambient air cooled condensing heat exchangers. Consequently, the operating system 10 for a fuel cell power plant of the present invention substantially reduces weight and volume of such a plant while increasing efficiency of operation of the plant in all weather conditions in which a transportation vehicle may operate or a stationary power plant may be deployed.

While the present invention has been described and illustrated with respect to a particular construction and method of use of the operating system 10 for a fuel cell power plant, it is to be understood that the present invention is not to be limited to the described and illustrated embodiments. For example, the first, second, third, and fourth heat exchangers 44, 62, 64, 68, plant exhaust heat exchanger 101 and coolant radiator 114 have been shown schematically as separated from each other for ease of understanding. For purposes of efficiency however, those components may be stacked together to take advantage of common ducting, or for efficiency in fluid flow and heat exchange. Additionally, although the operating system 10 of the present invention has been primarily described in the context of a "PEM" fuel cell, the operating system is applicable to other fuel cells utilizing other solid polymer or aqueous electrolytes. Accordingly, reference should be made primarily to the following claims rather than the foregoing description to determine the scope of the invention.

What is claimed is:

1. An operating system for a fuel cell power plant that generates electrical energy from a reducing fluid and an oxidant fluid, the system comprising:

a. at least one fuel cell means for producing the electrical energy from the reducing and oxidant fluids;
   b. fuel processing component means including a reformer and a burner for processing a hydrocarbon fuel into the reducing fluid;
   c. a direct mass and heat transfer device means secured in fluid communication with both a primary oxidant passage that directs the oxidant fluid as a process oxidant stream into the fuel cell means and also with a plant exhaust passage that directs a plant exhaust stream out of the plant for directly transferring mass and heat exiting the plant within the plant exhaust stream back into the plant within the process oxidant stream, wherein the direct mass and heat transfer device means includes a transfer medium means for sorbing a fluid substance consisting of polar molecules within the plant exhaust stream and for desorbing the fluid substance consisting of polar molecules into the process oxidant stream, and a separator housing means for supporting the transfer medium means in mass transfer relationship with the plant exhaust stream leaving the plant and process oxidant stream entering the fuel cell so that both streams contact the mass transfer medium means, and for preventing bulk mixing of the Plant exhaust and process oxidant streams; and,
   d. a split oxidant passage that directs the process oxidant stream into and through the fuel cell means and directs a reformer feed portion of the process oxidant stream through at least one reformer feed branch of the split oxidant passage to the fuel processing component means, and directs an exhaust portion of the process oxidant stream through an exhaust branch of the split oxidant passage into the plant exhaust passage.

2. The operating system for a fuel cell power plant of claim 1, wherein the split oxidant passage includes a first reformer feed branch that directs a first reformer feed portion of the process oxidant stream leaving the fuel cell means from a cathode exhaust passage to the reformer.

3. The operating system for a fuel cell power plant of claim 1, wherein the split oxidant passage includes a fuel cell to burner feed branch that directs a reformer feed portion of the process oxidant stream leaving the fuel cell from a cathode exhaust passage to the burner and from the burner to the reformer through a reformer feed line in fluid communication between the burner and the reformer.

4. The operating system for a fuel cell power plant of claim 1, wherein the split oxidant passage includes an oxidant inlet line to fuel processing component feed branch that directs a reformer feed portion of the process oxidant stream entering the fuel cell within the oxidant inlet line from the oxidant inlet line to the burner and from the burner to the reformer through a reformer feed line in fluid communication between the burner and the reformer.

5. The operating system for a fuel cell power plant of claim 1, wherein the transfer medium means comprises a liquid water portion of an ionomeric membrane, and the separator housing means comprises membrane portions supporting the liquid water of the ionomeric membrane.

6. The operating system for a fuel cell power plant of claim 1, wherein the transfer medium means comprises a desiccant material capable of sorbing moisture from a gaseous stream and capable of desorbing moisture into a gaseous stream, and the separator housing means comprises an enthalpy wheel supporting the desiccant material in a plurality of passages running generally parallel to an axis of rotation of the enthalpy wheel and the enthalpy wheel is rotationally supported within inlet and exhaust chambers of the separator housing so that the wheel rotates about an axis parallel to flow of the process oxidant stream through the inlet chamber and the plant exhaust stream through the exhaust chamber to directly transfer sorbed moisture from the plant exhaust stream to the process oxidant stream.

7. The operating system for a fuel cell power plant of claim 1, wherein the system further comprises coolant means for removing heat from the fuel cell, wherein the coolant means includes a sealed coolant plate and an antifreeze solution passing through the coolant plate.

8. The operating system for a fuel cell power plant of claim 1, wherein the system further comprises an oxidized anode diversion line, secured in fluid communication with the burner and an oxidant inlet line that directs the process oxidant stream into the fuel cell means, which oxidized anode diversion line directs a portion of an oxidized anode stream from the burner into the oxidant inlet line, the oxidized anode exhaust stream being an anode exhaust stream directed within an anode exhaust passage from the fuel cell to the burner and oxidized in the burner.

9. An operating system for a fuel cell power plant that generates electrical energy from a reducing fluid and an oxidant fluid, the system comprising:
   a. at least one fuel cell means for producing the electrical energy from the reducing and oxidant fluids;
   b. fuel processing component means including a reformer and a burner for processing a hydrocarbon fuel into the reducing fluid;
   c. a direct mass and heat transfer device means secured in fluid communication with both a primary oxidant passage that directs the oxidant fluid as a process oxidant stream into the fuel cell means and also with a plant exhaust passage that directs a plant exhaust stream out of the plant for directly transferring mass and heat exiting the plant within the plant exhaust stream back into the plant within the process oxidant stream;
   d. a split oxidant passage that directs the process oxidant stream into and through the fuel cell means and directs a reformer feed portion of the process oxidant stream through at least one reformer feed branch of the split oxidant passage to the fuel processing component means, and directs an exhaust portion of the oxidant stream through an exhaust branch of the split process oxidant passage into the plant exhaust passage; and,
   e. an anode exhaust passage that receives an anode exhaust stream exiting the fuel cell means and directs the anode exhaust stream into the burner, and directs an oxidized anode exhaust stream from the burner into heat exchange relationship with the reformer feed portion of the process oxidant stream within the reformer feed branch of the split oxidant passage.

10. The operating system for a fuel cell power plant of claim 9, wherein the split oxidant passage includes a first reformer feed branch that directs a first reformer feed portion of the process oxidant stream leaving the fuel cell means from a cathode exhaust passage to the reformer.

11. The operating system for a fuel cell power plant of claim 10, wherein the split oxidant passage includes a second reformer feed branch that directs a second reformer feed portion of the process oxidant stream leaving the fuel cell from a cathode exhaust passage to the burner and from the burner to the reformer through a reformer feed line in fluid communication between the burner and the reformer.

12. The operating system for a fuel cell power plant of claim 11, wherein the split oxidant passage includes a third reformer feed branch that directs a third reformer feed portion of the process oxidant stream entering the fuel cell within an oxidant inlet line from the oxidant inlet line to the burner and from the burner to the reformer through a reformer feed line in fluid communication between the burner and the reformer, and the system further comprises coolant means for removing heat from the fuel cell, wherein the coolant means includes a porous coolant plate.

13. The operating system for a fuel cell power plant of claim 10, wherein the system further comprises a first heat exchanger means for passing the first reformer feed portion of the process oxidant stream within the first reformer feed branch of the split oxidant passage in heat exchange relationship with the oxidized anode exhaust stream.

14. The operating system for a fuel cell power plant of claim 13, wherein the system further comprises a second heat exchanger means for passing the anode exhaust stream in heat exchange relationship with a reformed reducing fluid exiting the reformer.

15. The operating system for a fuel cell power plant of claim 14, wherein the system further comprises a third heat exchanger means for passing the reducing fluid entering the reformer in heat exchange relationship with a reformed reducing fluid exiting the reformer.

16. The operating system for a fuel cell power plant of claim 15, wherein the system further comprises a fourth heat exchanger means for passing the second reformer feed portion of the process oxidant stream in heat exchange relationship with the oxidized anode exhaust stream.

17. The operating system for a fuel cell power plant of claim 9, wherein the system further comprises an oxidized anode diversion line, secured in fluid communication with the burner and an oxidant inlet line that directs the process oxidant stream into the fuel cell means, which oxidized anode diversion line directs a portion of the oxidized anode stream from the burner into the oxidant inlet line.

18. The operating system for a fuel cell power plant of claim 16, wherein the direct mass and heat transfer device means includes a transfer medium means for sorbing a fluid substance consisting of polar molecules within the plant exhaust stream and for desorbing the fluid substance consisting of polar molecules into the process oxidant stream, and a separator housing means for supporting the transfer medium means in mass transfer relationship with the plant exhaust stream leaving the plant and process oxidant stream entering the fuel cell so that both streams contact the mass transfer medium means, and for preventing bulk mixing of the plant exhaust and process oxidant streams.

19. The operating system for a fuel cell power plant of claim 18, wherein the transfer medium means comprises a liquid water portion of an ionomeric membrane, and the separator housing means comprises membrane portions supporting the liquid water of the ionomeric membrane.

20. The operating system for a fuel cell power plant of claim 16, wherein the system further comprises coolant means for removing heat from the fuel cell, wherein the coolant means includes a sealed coolant plate and an antifreeze solution passing through the coolant plate.

21. A method of operating a fuel cell power plant of the type having at least one fuel cell means for producing electrical energy from reducing and oxidant fluids, and having fuel processing components means including a reformer and a burner for processing a hydrocarbon fuel into the reducing fluid, the method comprising the steps of:
   a. providing a direct mass and heat transfer device secured in fluid communication with both a primary oxidant passage that directs the oxidant fluid as a process oxidant stream into the fuel cell means and also with a plant exhaust passage that directs a plant exhaust stream out of the plant for directly transferring mass exiting the plant within the plant exhaust stream back into the plant within the process oxidant stream;

b. directing a reformer feed portion of the process oxidant stream within a reformer feed branch of a split oxidant passage from the fuel cell to the fuel processing component means, and directing an exhaust portion of the process oxidant stream within an exhaust branch of the split process oxidant passage from the fuel cell to the plant exhaust passage; and, c. directing an anode exhaust stream exiting the fuel cell through an anode exhaust passage into the burner, then directing an oxidized anode exhaust stream from the burner into heat exchange relationship with the reformer feed portion of the process oxidant stream within the reformer feed branch of the split oxidant passage.

22. The method of operating a fuel cell power plant of claim 21, comprising the further steps of directing the oxidized anode exhaust stream from heat exchange relationship with the reformer feed portion of the process oxidant stream to the plant exhaust passage.

23. The method of operating a fuel cell power plant of claim 22, comprising the further steps of directing a second reformer feed portion of the process oxidant stream exiting the fuel cell within a second reformer feed branch of the split oxidant passage to the burner, and providing a sealed coolant plate within the fuel cell for removing heat from the fuel cell.

24. The method of operating a fuel cell power plant of claim 22, comprising the further steps of directing a portion of the reformer feed portion of the process oxidant stream entering the fuel cell within an oxidant inlet line to fuel processing component feed branch of the split oxidant passage from the oxidant inlet line to the burner and from the burner to the reformer, and providing a porous coolant plate within the fuel cell for removing heat from the fuel cell.

* * * * *